3,063,307
Patented Nov. 13, 1962

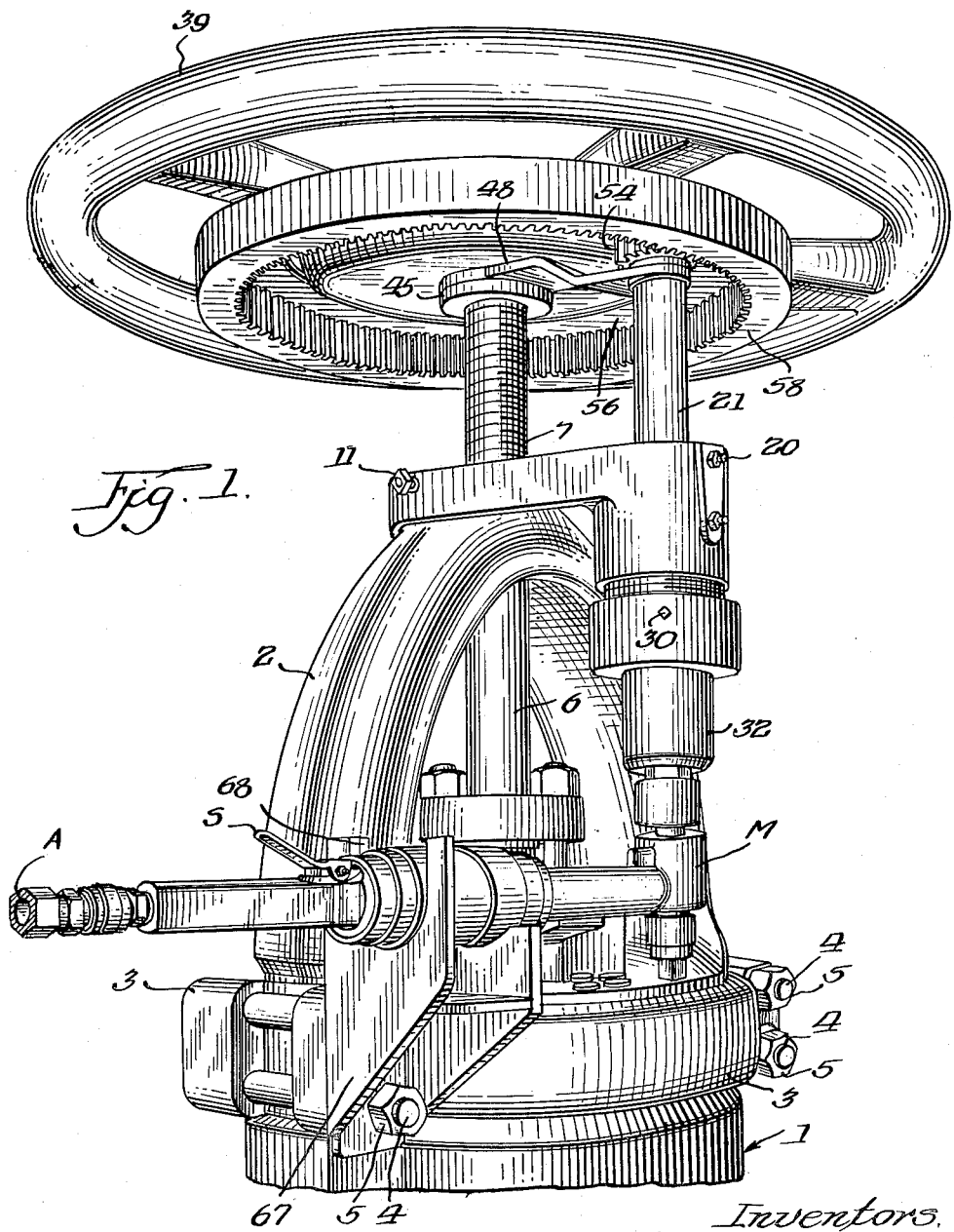

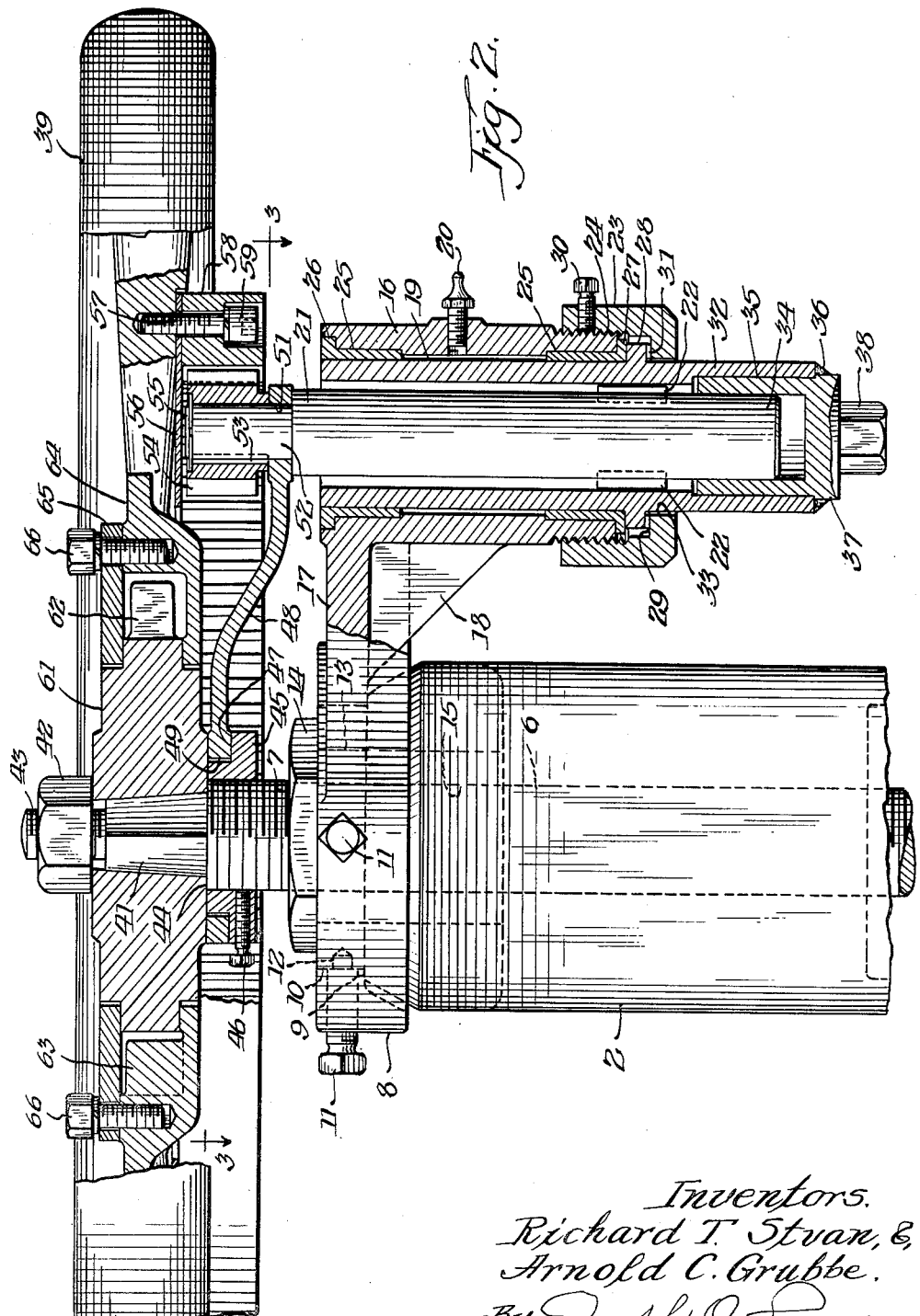

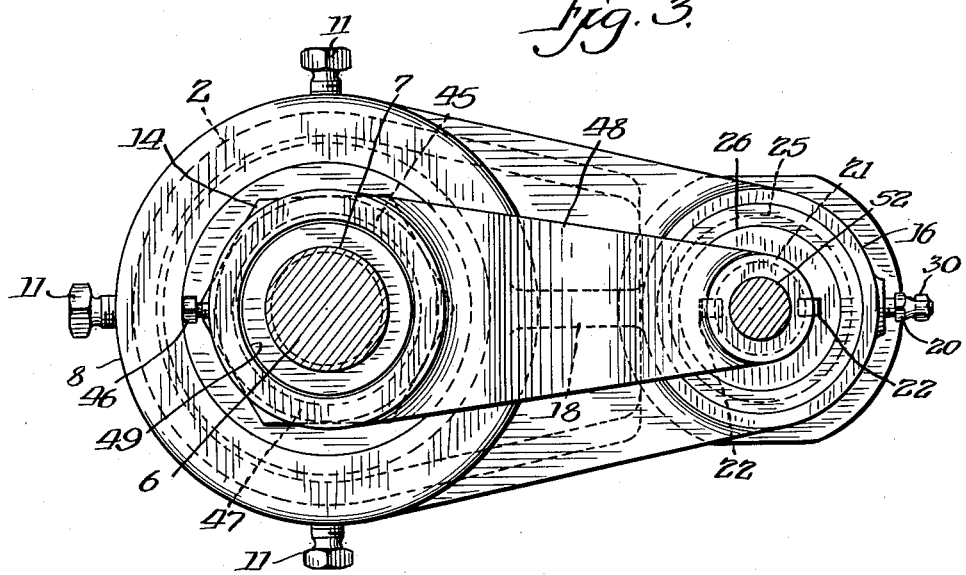
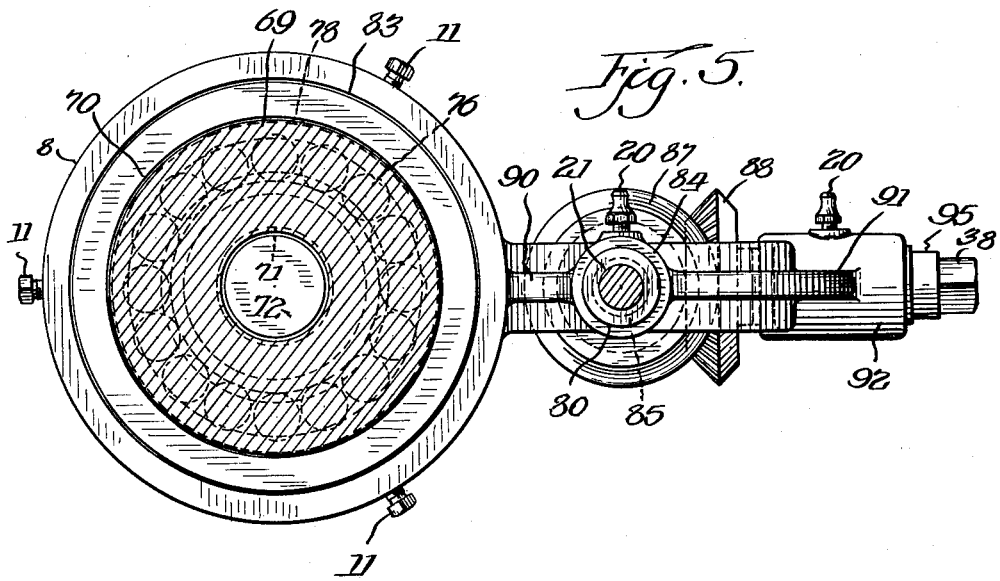

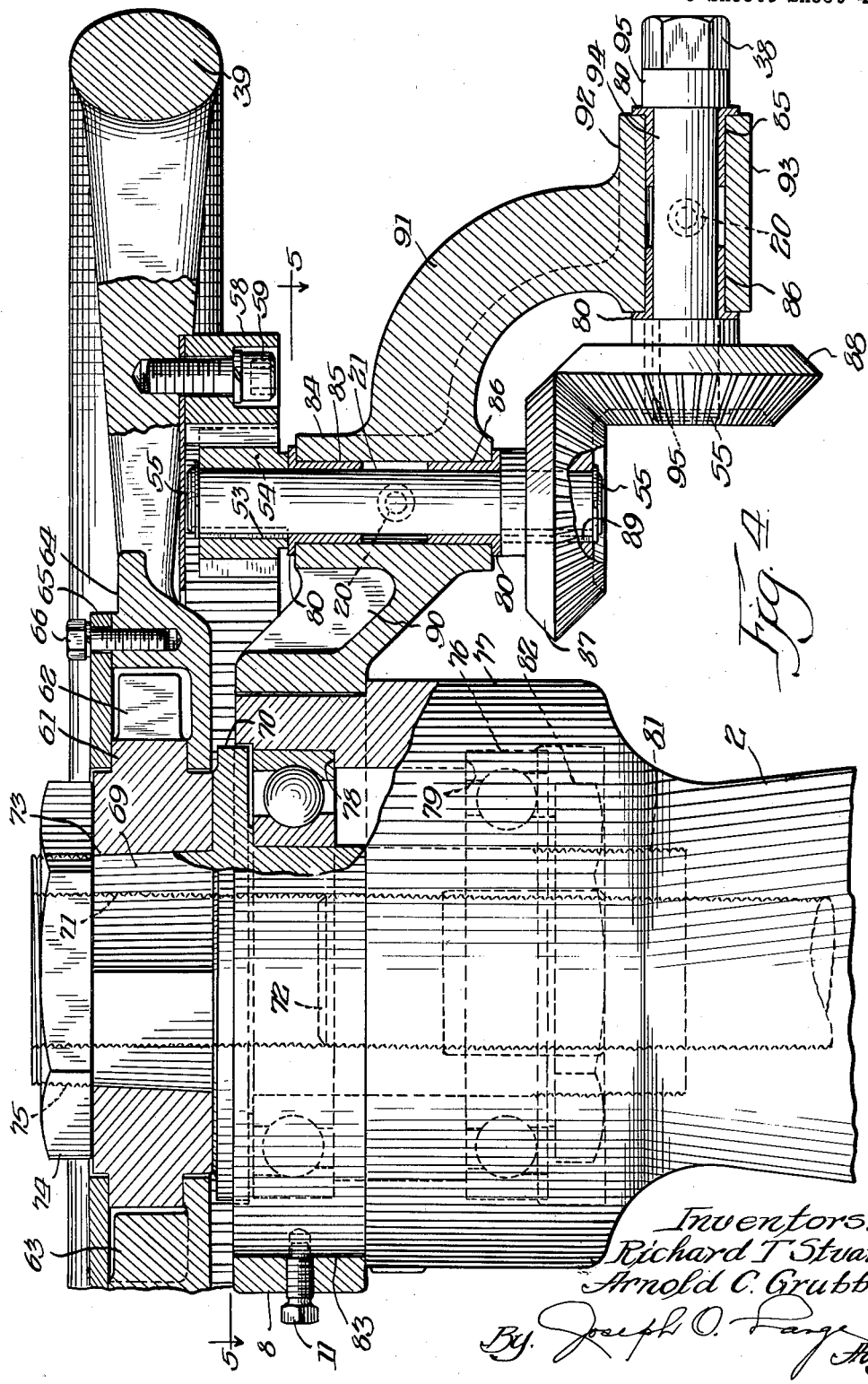

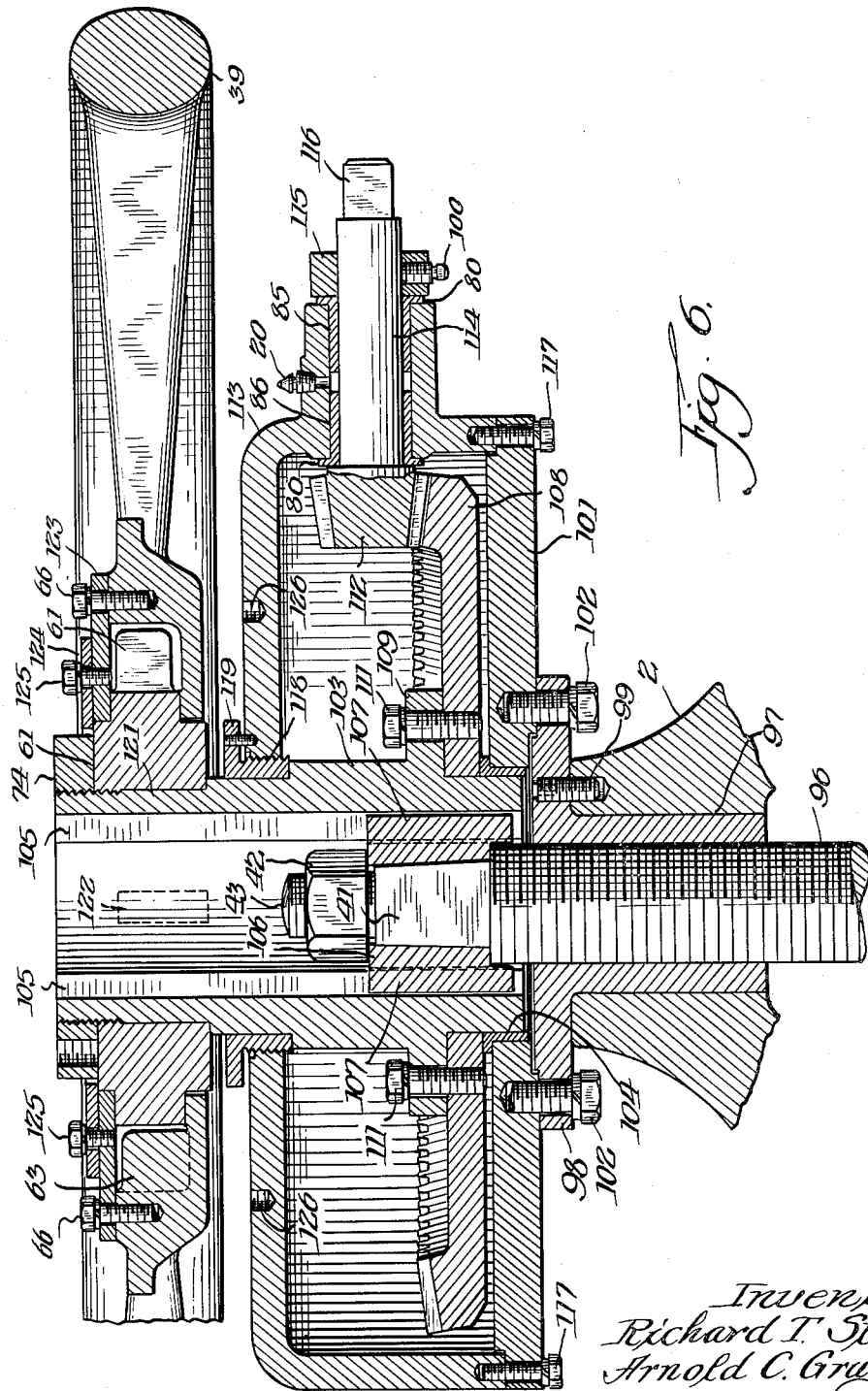

3,063,307
GEAR-OPERATED UNIT
Richard T. Stvan, Westchester, and Arnold C. Grubbe, Lombard, Ill., assignors to Crane Co., Chicago, Ill., a corporation of Illinois
Filed Nov. 3, 1960, Ser. No. 66,970
14 Claims. (Cl. 74—625)

This invention relates generally to valve operating means, and, more particularly, it is concerned with a portable unit type of valve operator readily adapted for effecting the convenient actuation of the valve disc or closure member. It is particularly suitable for those valve constructions in which a rising stem design is employed, but, as will be apparent, not so limited.

At the outset, in order to acquire a better understanding and appreciation of the background of this invention, it should be realized that heretofore in valve operators, relatively expensive and permanently affixed units have been most frequently used which have required costly upkeep in addition to their initial cost and installation thereof. Such operators are largely employed where manual actuation is inconvenient, considering the length of time required in the valve actuation process as well as from the fact that in many instances the valves are rather difficult to operate manually and are operated infrequently so as to cause such difficulties in many cases.

It is accordingly one of the principal objects of this invention to provide a portable or unit type of valve actuating mechanism or the like in which a suitable driving means such as a fluid drive, air, or an electric motor can be economically, quickly, and conveniently applied to open or close the valve as desired to provide for the operation thereof.

A further object is to provide for a valve actuating means in which the gear mechanism preferably used is substantially protected and so mounted as to minimize the occasion for injury to the operator, while at the same time, permitting simple manual actuation when necessary, as, for example, by means of a handwheel, lever, or the like.

Another object is to provide for a valve operator in which the construction allows for the visual indication of the valve position to the field attendant, such as being open, throttled or closed.

A further object is to provide for a portable unit construction in which a durable and economical gear mounting may be used and easily applied on the valves already installed in the field, such application being done with a minimum amount of structural modification in the valve portion receiving the portable unit adapter.

Other objects and advantages of the invention will become more readily apparent upon proceeding with the specification read in light of the accompanying drawings, in which:

FIG. 1 is an exterior fragmentary view of a valve employing one form of a portable unit embodying this invention;

FIG. 2 is a sectional view in fragmentary transverse section of the actuator construction referred to in FIG. 1;

FIG. 3 is a sectional view taken on the line 3—3 of FIG. 2;

FIG. 4 is a transverse sectional view of a modified form of construction;

FIG. 5 is a sectional view taken on the line 5—5 of FIG. 4; and

FIG. 6 is a transverse sectional view of a further modified form.

Similar reference numerals refer to similar parts throughout the several figures.

Referring now to FIG. 1 showing an upper portion of a conventional valve, the valve generally designated 1 in fragmentary form is of a well recognized construction shown in United States Patent No. 2,744,651, granted May 8, 1956, insofar as the valve bonnet or yoke construction is concerned, so that it is therefore unnecessary to dwell at further length as to such valve construction details. The yoke 2 is fixedly attached to the body 1 by means of the usual split clamp 3 which is held in place by means of the usual studs 4 and nuts 5. Journalled within the upper portion of the yoke 2 is a valve stem 6, threaded as at 7 to engage the yoke so that upon suitable rotation of the stem, as hereinafter described in more detail, the valve closure member (not shown) is raised or lowered in order to effect the desired opening, throttling or closing of the valve, depending upon the direction and degree of rotation of the said stem.

As shown more clearly in FIG. 2, the upper portion of the yoke 2 is formed as at 10 with a cylindrical shank portion to removably receive the gear bracket 8. In order to secure the latter member firmly in position after being shouldered upon the yoke annular surface 9, the set screws 11 are applied, suitably spaced apart and preferably annularly distributed. The said screws are threadedly received and have the dog-point or reduced ends 12 to positively engage a suitably drilled recess within which said reduced end is received. Obviously, other convenient methods of attachment may be used here, such as a bayonet connection, threads or the like. A threaded yoke bushing 13 formed at its upper portion with the hexagon 14, receiving the rotatable threaded stem within the internal threads indicated in dotted lines at 15 of the said bushing. The gear bracket is thus securely mounted upon the yoke and at substantially its outer transverse limit it is provided with a vertically extending elongated hollow cylindrical portion 16 preferably integrally connected to the said yoke upper portion by means of the interposed arm or extension section 17 and having at its underside the reinforcing web portion 18 for imparting additional rigidity and strength thereto. Supported within said hollow cylindrical portion 16, a gear bracket sleeve 19 is accordingly assembled and within which the pinion shaft 21 is received in order to retain the said pinion shaft in non-rotatable relation to the sleeve 19. In the latter connection, suitable locking keys 22 engage the sleeve and pinion shaft, as shown, and thus provide the rotation of the shaft 21 and the sleeve 19 together for reasons hereinafter made apparent. The keys 22 move within the opposite keyways for virtually the full length thereof as the valve is opened or closed moving together with the rising stem 6.

In order to hold the sleeve 19 against endwise or axial movement, a threaded sleeve nut 23 is threadedly applied to the outer threads as at 24 provided on the cylindrical extension 16 of the gear bracket as shown. Between said extension and the exterior of the sleeve 19, the upper and lower hardened bearings 25 and 26 are preferably employed, the hardened bearing 26 having a flanged annular portion 27 engaging an integral annular shouldered portion 28 of the sleeve 19. Between an inner annular surface 29 and said annular shouldered portion 28 of the sleeve, a friction washer 31 is preferably interposed. The said sleeve is thus held against substantial longitudinal movement between the shoulder 28 and the surface 29, the upper portion of the shoulder 28 bearing against the annular flange portion 27 of the lower hardened bearing 26 as illustrated. The threaded sleeve nut 23 is thus drawn up on the threads 24 against the respective annular shoulders 27 and 28 and retained against the friction washer 31 with a predetermined amount of clearance for the shoulder portion 28, so that the sleeve 19 may be suitably rotated, while permitting only a limited amount of sleeve endwise or axial movement.

It will be noted that the lower portion 32 of the sleeve 19 projects through the opening 33 of the sleeve nut 23, the pinion shaft 21 at its lower end portion 34 preferably being received within the sleeve collar 35, the latter member being welded or otherwise attached annularly at 36 to the enlarged or shouldered end portion 37 of said collar.

A significant aspect of this invention here is that the sleeve collar 35, as indicated, is provided at its lower end with an integral attachment means such as the hexagonal or other form of polygonal nut 38 to provide the drive connection between a relatively small portable driver means such as an air or an electrically driven drill or similar tool and the pinion shaft 21 and the sleeve 19. It will, of course, be appreciated that while a simple hexagonal nut is illustrated, other types or forms of driver-adaptors or driving connections can be used for effecting the connection between the motor and the shaft. It will be equally apparent that a wide variety of small reversible motors or drive units may be used to rotate the aforementioned drive shaft and sleeve, depending upon the nature of the operations and conditions encountered in the field.

A handwheel 39 is fitted upon the stem 6 by means of the usual tapered square portion 41, the stem being held in place by the wheel nut 42, the latter member threadedly engaging the integral stud 43 projecting from the stem square 41 as shown. This arrangement allows for attaching the handwheel securely relative to the stem annular surface 44. However, before the handwheel is attached as above described, the pinion guide bracket collar 45 is mounted in position to fit over the upper end of the stem threads 7. After properly adjusting its position axially relative to the stem, said collar is held against relative rotation to the stem by means of the set-screw 46. The guide bracket collar 45 is provided with the recessed annular surface 47 for receiving and supporting thereon the pinion guide bracket 48 apertured as at 49 to fit over the reduced annular portion of the collar 45 above the annular surface 47 as shown. It will be understood that the bracket 48 is thus limitedly adjustable rotatably before the set-screw 46 is tightened to be arcuately movable to coincide with the position of the pinion shaft 21. The latter positioning will depend upon the location of the gear bracket 8 relative to the yoke 2.

The outer end limit of the arm-like extension of the pinion guide bracket 48 is apertured as at 51 to extend over and be mounted upon the upper shank portion 52 of the pinion shaft 21. In non-rotatable relation thereto, as indicated by the key at 53, a pinion gear 54 is positioned thereon, having the retaining lock-ring 55 to hold the pinion gear 54 in place upon the pinion guide bracket 48, as shown, the latter being preferably supported by the shaft 21 at the shoulder portion from which the shank 52 extends.

The underside of the handwheel 39 is preferably provided with a recessed annular portion for receiving the annular protective plate 56 apertured as at 57 for attachment to the handwheel. The said protective plate serves as a shield to protect the attendant against injury to his fingers relative to the gearing in the course manually operating the handwheel. Abuttingly applied against the plate 56 is the annularly formed internal gear 58, held in place on the handwheel by a plurality of annularly spaced attaching screws 59, thereby to also clamp the protective plate 56 in assembled position as shown. It will be clear, therefore, that as the handwheel is rotated, the internal gear 59 will be similarly moved with the wheel.

The handwheel hub 61 between the radially extending spokes is provided with the outwardly extending hammerblow lug 62, which it should be understood, upon suitable rotation thereof will contact the abutment 63. It will be clear that when such impact is made between the lug 62 and the abutment 63 the handwheel 39 will be rotated, whereby to rotate the stem 6 polygonally attached as at 41 to the wheel hub 61 and thus the valve to open or closed position, depending upon the direction employed in turning the handwheel 39. It will also be noted that the portion of the handwheel at 64 carrying the abutment 63 provides the annular chamber within which the lug 62 and the abutment 63 are arcuately moved to provide for the hammerblow construction effectively and relatively economically. The attaching cover plate 65 of annular form is mounted upon the portion 64 of the handwheel and is retained in position by means of the bolt studs 66, thereby to provide for the attachment permitting limited rotatability relative to the handwheel hub 61 to effect the hammerblow function described.

Reference to FIG. 3, which section is taken on the line 3—3 of FIG. 1, will show more clearly the preferred configurations in plan of the yoke bracket as well as the pinion guide bracket, in addition to the manner in which the pinion shaft is journalled in the bracket at 16. Suitable lubricating means, such as at the lubricant gun connection at 20, may be used to lubricate the bearings at 25 and 26 for the rotating sleeve 19. A dog-point or lock screw 30 more clearly shown in FIG. 2 holds the gear bracket sleeve nut 23 and sleeve 19 in position after determining the desired clearance for rotation of the sleeve 19.

As to the mode of operation of the assembled structure described in connection with FIGS. 1 to 3 inclusive, it will now be clear that with the mounting of the bracket adapter 8 upon the yoke 2 as illustrated and upon the application of the portable motor M in driving position by its engagement of the drive nut 38 on the sleeve portion 32, as shown more clearly in FIG. 1, then suitably actuating the valve or switch S, air flow from inlet A, the desired rotation of the pinion shaf 21 will take place. This movement of the shaft sets in motion the head M thus to effect rotation of the pinion gear 54 and the meshed internal gear 58 together with the handwheel 39. Relative rotative motion of the handwheel 64 initially occurs until the lug 62 is struck by the rotating abutment 63, whereupon rotative movement is then imparted to the stem 6 for effecting the opening or closing movements of the valve depending on the direction of the stem rotation.

As shown more clearly in the exterior view of FIG. 1, it has been found desirable in cases where the portable motor M is of such substantial size and weight as to require it, a supporting bracket 67 is attached to the yoke clamp 3 by means of the bolts 4 by means of the nuts 5 and is relieved or cradled as indicated at 68 to receive and support said motor and head M. It will be apparent also that the particular form of the supporting bracket 67 can vary in its configuration as the motor or driving means changes in its size and form to suit the conditions met in the field. In the construction illustrated, an air motor driving means is shown, but it will be understood that any suitable electric motor or other power means may be used to effect the desired operation of the pinion gear shaft 21.

It should be noted further that since the pinion shaft 21 in this construction moves axially simultaneously with the valve stem 6 the described arrangement of the shaft moving within the bracket portion 16 conveniently functions as an indicator to show the axial position of the valve stem and thus accurately show the attendant the location of the valve closure member within the valve. It will be appreciated that the shaft 21 could also be properly notched or otherwise marked on is periphery to show this positioning of the valve more accurately if desired.

Referring now to a further modified form in FIG. 4, space requirements of the installation in some cases may make it desirable to allow for the application of a driving means such as a portable motor from a position of vantage substantially at right angles to that illustrated in FIGS. 1 to 3 inclusive, and in such case, a modification making use of mitre gears may be used.

The mounting upon the yoke 2 in this construction allows for a gear bracket generally designated 8 and held in a manner similar to that described in connection with the previous figures by means of a locking dog-point screw 11. In this construction, a rotatable yoke sleeve 69 internally threaded receives as at 71 the threaded rising valve stem 72, the yoke sleeve being attached to the handwheel hub portion 61 rotatably by means of the polygonal portion 73. It is held against substantial axial movement by means of the threaded nut 74 engaging the threaded shank 75 at the upper end limit thereof. It is usual for convenience in mounting a yoke sleeve and for facilitating its rotative function to use roller bearings as at 76, the latter being shouldered at 70. The said bearings are mounted within the yoke hub 77, as indicated at annular shoulders 78 and 79 respectively. The hub 77 being hollow allows for a chamber from which the yoke sleeve 69 projects therethrough and thus allows for its threaded lower shank portion 81 to be threadedly secured in the lower nut 82. The yoke sleeve 69 is held firmly in position against substantial axial movement, while allowing for its rotatability in the manner usually applied by the handwheel 39. It is also guided in its positioning within the yoke by means of the flange 70. In this modified construction, the yoke hub 77 is provided with the turned extension 83 receiving the gear bracket 8 which is held in secure position thereon as previously described in connection with the previous figures. The gear bracket has a radially extending portion preferably made integral therewith as indicated at 84, the bracket extension being hollow and bored to receive the usual upper and lower bearings 85 and 86, the latter members being outwardly flanged at 80 and are held in place by means of the pinion gear 54 attached to the pinion shaft 21 in the manner similar to that described for FIGS. 1 to 3 inclusive.

At the lower portion of the assembly of the pinion shaft 21, a pair of meshed mitre gears 87 and 88 are mounted, the gear 87 being locked against rotation relative to the shaft 21 by means of the key 89. The gear bracket extension 84 reinforced at webbing 90 for support of the mitre gears 87 and 88 is provided with the curved integral bracket portion 91 having at its lower limit 92 the horizontally extending hollow cylindrical portion 93 which portion journally receives the gear shaft 94 as shown. The latter member is pinned to the mitre gear 88 and is supported upon the similarly hardened bearings 85 and 86 in the same manner as described in connection with the gear 87. The said bearings are also formed with the outwardly extending flanges 80.

To hold the pinion shaft 94 in place against endwise movement, thrust washers 95 and a locknut are used, the gears being retained on their respective shafts by the split lock washers 55. For the same purpose as described in connection with FIGS. 1 to 3 inclusive, a nut 38 is used functioning as the adapter means to receive the motor drive unit M previously referred to for imparting motion to the gears. At the upper portion of the instant modified gear bracket assembly and for the same purpose as described in connection with the previous figures, the hammerblow lug 62 and the abutment 63 are applied on the inner recess of the portion 64 of the handwheel 39. It functions in the same manner as described in connection with the previous figures and therefore further elaboration is unnecessary. Protective cover plates 56 and 65 are applied for the same object as above described, the cover plate 65 being attached to the rim of the wheel recessed portion 64 by means of the cap screws 66.

In providing for the operation of the modified form shown in FIGS. 4 and 5, it will be clear that when the motor driving unit M is connected to the adapter nut 38, the meshed mitre gears 87 and 88 will rotate with their respective shafts 21 and 94 to which they are pinned as at 89, thereby to rotate the pinion gear 54 and the internal gear 58, together with the connected handwheel portion 39. The latter member is non-rotatably attached to the rotatable yoke sleeve 69 and thereby causes the internally threaded yoke sleeve by its rotation to move the threaded valve stem 72 axially, such axial movement depending upon the direction of rotation of the said yoke sleeve.

It will be appreciated that in some cases because of the nature of the installation encountered, it would be impractical to apply the motor drive means M in the manner shown and described in connection with FIGS. 1 to 3 inclusive. In these special installations, the arrangement shown in FIGS. 4 and 5 is of particular benefit.

Referring now to a further modified form of assembly, a bevel gear driving unit is shown in FIG. 6. In this modification, a hammerblow handwheel can also be used as described in connection with the previous figures. In this assembly likewise, the attachment of the drive unit to the valve yoke 2 can conveniently and economically be effected. In the instant construction, the rising stem 96 of the valve for raising and lowering the conventional valve closure or gate (not shown) is threadedly received within the stem bushing 97, the latter member being annularly flanged outwardly as at 98 and is locked against rotation relative to the said yoke by means of the lock screw 99. A mounting plate 101 for the operating unit is supported upon said flanged portion 98 of the bushing 97. It is attached thereto by means of the bolt studs 102. In this modification, a stem guide sleeve 103 of generally tubular configuration is journalled within the bushing 104 of the unit mounting plate as shown. On its interior central portion, the said guide sleeve has the oppositely disposed longitudinal slots or key-ways 105 extending for the full length thereof to receive the stem guide 106 having the similarly arranged co-acting ribs 107 outwardly of the stem guide to engage the key-ways in the course of the stem longitudinal movement as hereinafter described.

In non-rotatable relation to the stem guide sleeve 103, a bevel gear 108 is mounted in non-rotatable relation thereto, engaging the lower shank portion of the sleeve 103 defined by that portion entering the said bushing 104. It is attached to the said flange 109 by means of the annularly disposed bolt studs or cap screws 111 as shown. As shown, on its outer horizontal periphery, the bevel gear 108 is meshed with the pinion gear 112. The latter member is journalled within a wall portion of the gear housing 113 by means of the pinion gear shaft 114 mounted for rotation within the usual hardened bearings 85 and 86 annularly flanged at 80 and held against longitudinal movement by means of the collar 115 and its set-screw 100. The said pinion shaft at its outer end limit is provided with the polygonal extension or square portion 116 which functions as the means for providing the desired connection to a motor drive unit such as M in the manner similar to that arrangement described in connection with the drive connecting nut 38 of the previous figures. The housing 113 is attached to the mounting plate 101 by means of the annularly disposed bolt studs 117, the said housing at its upper face portion being threaded as at 118 to receive the threaded bushing 119 serving as a retaining bearing for the rotatable stem guide sleeve 103.

At the upper end portion of the said stem guide sleeve, the latter member is formed as at the threaded upper portion 121 to receive the usual handwheel hub 61, the latter member being snugly mounted on the stem guide sleeve 103 and shouldered as indicated. It is held against rotation relative to the member 103 by means of the key 122, thereby holding the handwheel hub 61 in non-rotatable relation to the stem guide sleeve 103. A sleeve nut 74 engages the upper threaded portion of the stem guide sleeve, and holds the handwheel hub 61 firmly in place. The handwheel 39 in the same manner as described previously for effecting the hammerblow function is provided with the lug 61 and the abutment 63 with a suitable retaining cover plate 123, attached to the wheel inner rim portion by means of the bolt studs 66. For the purpose of further sealing the lower plate 123, an upper plate 124, also attached by means of the bolt studs 125, may be used, although this is not always required.

In such cases where a large valve requires a relatively large operating unit, mounting the housing 113 accurately and conveniently in place on the valve, positioning attachment taps, such as 126, may be used for receiving threaded eye-bolts or the like (not shown) for such purpose.

In summary, it will be apparent that a relatively simple and convenient means for substituting portable unit motor operation for hand-driven means has also been accomplished here. While several embodiments have been set forth and described, it will also be appreciated that these are merely examples for illustrative purposes, showing the broad scope of the invention. It is not intended to limit the invention to the specific forms shown and described. It is therefore our desire to be limited only by the scope of the appended claims.

We claim:

1. Actuating means for a valve with a stem threadedly received in a yoke for rotatable movement to effect axial movement of the stem, the combination of a gear bracket removably mounted on the upper portion of the yoke, the said bracket having a transversely disposed hollow extension, a handwheel on the stem overlying the said bracket, an internal gear attached to said handwheel, a pinion gear meshing with said internal gear, a shaft for supporting said pinion gear, the said shaft being journalled within the hollow extension of the said gear bracket and having at an end portion thereof means for connection to a portable motor drive means and means cooperating with said stem and yoke for positioning said pinion guide bracket axially relative to said pinion shaft, the said stem and pinion shaft moving axially together upon rotation of said pinion shaft and said gear elements.

2. Actuating means for a valve with a stem threadedly received in a yoke for rotatable movement to effect axial movement of the stem, the combination of a gear bracket removably mounted on the upper portion of the yoke, the said bracket having a radially disposed hollow cylindrical portion with a depending extension thereof below the yoke upper portion, a handwheel on the stem, an internal gear on the underside of said handwheel, a pinion gear movable within peripheral limits defined by said internal gear, an actuating shaft having an end portion cooperating with said pinion gear, the said actuating shaft being journaled within the hollow cylindrical portion of the said gear bracket and having at an opposite end portion means projecting therefrom for connection to a motor drive means, means cooperating with said stem and yoke for positioning said pinion guide bracket axially relative to said pinion shaft, the said stem and pinion shaft rotating together and moving axially with the said handwheel upon movement of said pinion shaft and said gear elements.

3. In means for operating a valve with a stem journaled in a yoke whereby to effect axial movement of the said stem, a gear bracket removably mounted on the upper portion of the yoke, the said bracket having a side disposed elongated hollow extension, a handwheel on the stem, an internal ring gear enclosed by a rim on the underside of said handwheel, a pinion gear meshing with said internal gear, a shaft cooperating with said pinion gear for effecting rotation of the latter member, the said shaft being guided within the hollow extension of the said gear bracket and having at an end portion thereof an adapter for predetermined attachment to a portable motor drive means, means on said stem for locating said pinion guide bracket in a predetermined plane relative to an end limit of said pinion shaft, the said stem and shaft being axially movable together upon rotation of said pinion shaft and said gear elements.

4. A removable gear operated actuating means for a valve or like mechanism, a yoke therefor, a stem journaled for reciprocating movement in the said yoke, a gear bracket removably attached to an upper limit of the said yoke, gearing cooperating with said bracket consisting of at least a pair of gears in meshed relation, shaft means for the gearing cooperating with an end limit of the gear bracket, a handwheel mounted on the yoke and being axially movable with the said stem, the said gearing being movable with the handwheel, the mounting for the said handwheel on a central portion thereof cooperating with the said gearing, the said pinion shaft having means adapted at an end limit thereof for connection with a portable driving means and at an opposite end thereof cooperating with a portion of the gearing below the plane of the said handwheel, the said stem and pinion shaft moving axially together upon rotation of said pinion shaft and gear elements.

5. In a portable valve actuating assembly, the combination of a yoke and a threaded stem therefor journaled in the yoke, gear means supported by the yoke comprising a gear and pinion for actuating said stem, means connecting the said gear means to the said yoke, the latter connecting means having means for removable attachment to an upper end portion of the said yoke, a rotatable axially fixed sleeve mounted above the said yoke for threadedly receiving the said stem and having a depending annular portion engaging the said yoke whereby to align said stem with the yoke, means on the said gear connecting means for engaging an annular portion of the said yoke, actuating shaft means carried by the said gear connecting means for journally supporting at least a portion of said gear means and means on the said actuating shaft means for effecting connection with a portable driving means.

6. In a portable valve actuating assembly, the combination of a yoke and a threaded stem therefor journaled in the yoke, gear means supported by the yoke comprising a gear and pinion for actuating said stem, angular bracket means connecting the said gear means to the said yoke, the latter connecting means including annularly disposed swivelling means for effecting said attachment to the said yoke, a fixed sleeve mounted at an upper open portion of the said yoke for rotatably receiving a threaded end portion of the said stem, means on the said gear connecting means for engaging an upper annular hub portion of the said yoke, the latter means having an outer transverse surface supporting a portion of said gear means, actuating shaft means carried by the said gear connecting means for journally supporting at least a portion of said gear means and having thereon radially extending means beyond the said shaft transversely mounted journaling means for effecting connection with a portable driving means.

7. In a portable valve actuating assembly, the combination of a yoke and a threaded stem therefor journaled in the yoke, gear means supported by the yoke comprising a gear and pinion for actuating said stem, means connecting the said gear means to the said yoke, the latter connecting means including means radially spaced apart for effecting said attachment to the said yoke, a sleeve mounted at an upper portion of the said yoke for receiving the said stem, a second sleeve above the first named sleeve non-rotatably engaging the said stem, casing means on the said gear connecting means centrally apertured for engaging an upper annular outer surface portion of the said yoke, actuating shaft means carried by the said gear connecting means for journally supporting at least a portion of said gear means, the said second sleeve non-rotatably engaging said stem, and means on the said actuating shaft means below said gear means for connecting predeterminately portable driving means to move the said shaft means, gear means and threaded stem.

8. In a portable valve actuating assembly, the combination of a yoke and a threaded stem therefor journaled in the yoke, gear means supported by the yoke comprising a gear and pinion for actuating said stem, means connecting the said gear means to the said yoke, the latter connecting means including annularly disposed removable means for effecting said attachment to the said yoke, a sleeve mounted at an upper portion of the said yoke for receiving the said stem, means on the said gear connecting means for engaging an annular hub portion of the said yoke, a casing for the gear means, actuating shaft means for the gear means for supporting at least a portion of said gear means, the said casing having transversely extending annular wall means for supporting journally at least a portion of said actuating means, and means on the said actuating shaft means projecting outside of the casing wall means for selective connection with portable driving means.

9. In a portable valve actuating assembly, the combination of a yoke and a threaded stem therefor journaled in the yoke for axial movement relative thereto, gear means supported by the yoke comprising a gear and pinion for actuating said stem, a casing for said gear means, means connecting the said gear means to the said yoke including an underportion of said gear casing, said casing having means for attachment to the said yoke, a sleeve fixedly connected to the said gear casing and mounted at an upper portion of the said yoke for rotatably receiving the said stem to permit axial movement thereof, a second sleeve mounted above the first named sleeve, a stem guide non-rotatably engaging an inner portion of the said second sleeve, means carried by the said casing on an outer peripheral wall portion thereof for supporting a least a portion of said gear means and means on an outer end portion of the said shaft for effecting connection with a portable driver, the said latter portion of said shaft extending radially outward of the said casing peripheral wall portion.

10. In a portable valve actuating assembly, the combination of a yoke and a threaded axially movable stem therefor journaled in the yoke, gear means supported by the yoke comprising a gear and pinion for actuating said stem, a casing for the gear means, a fixed sleeve mounted at an upper portion of the said yoke for receiving the said stem, a second sleeve rotatably movable therewith and having a stem guide member non-rotatably engaging an upper end portion of the stem, plate means on an undersurface portion of the said gear casing for engaging an annular outer limit portion of the said yoke, actuating shaft means carried by the said gear connecting means for journally supporting at least a portion of said gear means, the said stem guide member being axially movable within said second sleeve for a distance substantially measured by the length of the said latter member, end disposed means on the said shaft for effecting connection with a portable driving means, and means on the said second sleeve cooperating with said gear casing engaging means to centrally connect the said gear casing to the said yoke at the upper outer limit of the latter member.

11. In a valve operator means, the combination of a valve yoke, a threaded valve stem mounted for axial movement in the yoke, a gear bracket removably mounted on an upper portion of the said yoke, the said bracket having lateral extension means cooperating with gearing for effecting valve operation, the said gearing comprising a gear and a pinion therefor, a longitudinally movable shaft for the pinion, connecting means cooperating with an outer end limit of the yoke and with an undersurface of the said gear bracket for support of the said gear, a handwheel for the stem movable axially the said stem and with the said gear and pinion, and adapter means on the end of the pinion shaft for effecting attachment to a portable drive means whereby to rotate the pinion shaft and gearing and move the said shaft, gearing and stem axially together to open or close the valve.

12. Actuating means for a valve with a rotatable axially movable stem threadedly received in a yoke for rotatable movement to effect said axial movement of the stem, the combination of a gear bracket removably mounted on the upper end portion of the yoke, a yoke bushing for the said stem, the said bracket having a radially disposed hollow extension, a handwheel on the stem, a collar below the said handwheel mounted on the said stem, an internal gear on the underportion of said handwheel, a pinion gear within the handwheel meshing with said internal gear, a longitudinally movable shaft for supporting said pinion gear and cooperating with said radially disposed hollow extension portion of the said gear bracket, the said stem having a guide bracket for said pinion shaft on the underside of said handwheel, the said pinion gear shaft being journaled in a plane parallel to the central axis of said stem within the hollow extension of the said gear bracket and having at an end portion thereof adapter means attached thereto for connection to a portable motor drive means, said collar cooperating with the said stem and handwheel for adjustably positioning said pinion guide shaft bracket swivelably on the stem in a plane transverse to the axis of said pinion shaft, the said stem, pinion shaft, gears and handwheel being movable axially together relative to the said gear bracket upon predetermined rotation of said pinion shaft by said motor drive means.

13. Valve actuating means, the combination of a yoke and a rotatable stem threadedly received in said yoke for effecting axial movement to the stem upon predetermined rotation thereof, the combination of a gear casing with a stem guide sleeve and a stem guide therein engaging said sleeve within said gear casing, the said casing being removably mounted on an annular portion of the said yoke receiving said stem sleeve and guide, the said gear casing having a radially disposed hollow extension in its wall portion, a handwheel with a hub portion and having a rim portion predeterminately engageable with and relatively movable rotatably to the said hub portion of the handwheel upon predetermined rotation of the handwheel, a bevel gear attached to the said stem guide sleeve within said casing, a pinion bevel gear meshing with said first named bevel gear, a pinion shaft for supporting said last named gear, the said shaft being journaled within said hollow extension of the said casing and having at an end portion thereof means for connection to a portable motor drive means and flange-like plate means fixed on said yoke for receiving and positioning said stem axially relative to said yoke, the said stem positioning plate means providing for removable attachment of the said gear casing to the said valve yoke.

14. The subject matter of claim 12, including supporting means cooperating with the said yoke for substantially cradling and guiding the portable drive means when said latter means is connected to the pinion gear shaft and while the latter member is being driven by the portable drive means.

References Cited in the file of this patent

UNITED STATES PATENTS

| | | |
|---|---|---|
| 2,327,980 | Bryant | Aug. 31, 1943 |
| 2,352,140 | Trott | June 20, 1944 |
| 2,709,062 | Lamb | May 24, 1955 |
| 2,855,940 | Milleville et al. | Oct. 14, 1958 |
| 2,942,495 | Milleville | June 28, 1960 |
| 2,964,961 | Gulick | Dec. 20, 1960 |
| 2,971,400 | Milleville | Feb. 14, 1961 |